(12) United States Patent
Rittof et al.

(10) Patent No.: US 8,603,192 B2
(45) Date of Patent: Dec. 10, 2013

(54) SELECTIVE SALT RECOVERY FROM MIXED SALT BRINE

(75) Inventors: Timothy J. Rittof, West Chicago, IL (US); James F. Rieke, Naperville, IL (US)

(73) Assignee: Veolia Water Solutions & Technologies North America, Inc., Moon Township, PA (US)

( * ) Notice: Subject to any disclaimer, the term of this patent is extended or adjusted under 35 U.S.C. 154(b) by 487 days.

(21) Appl. No.: 13/032,241

(22) Filed: Feb. 22, 2011

(65) Prior Publication Data

US 2012/0213689 A1    Aug. 23, 2012

(51) Int. Cl.
   *C01D 1/30* (2006.01)
(52) U.S. Cl.
   USPC ........................................ 23/302 R; 23/295 R
(58) Field of Classification Search
   USPC ..................................... 23/302 R, 295 R, 303
   See application file for complete search history.

(56) References Cited

U.S. PATENT DOCUMENTS

| | | | |
|---|---|---|---|
| 1,759,361 | A | 5/1930 | Miller et al. |
| 1,853,275 | A | 4/1932 | Houghton et al. |
| 2,049,249 | A | 7/1936 | Cunningham |
| 4,291,002 | A | 9/1981 | Arnold et al. |
| 5,262,134 | A | 11/1993 | Frint et al. |
| 5,283,054 | A | 2/1994 | Copenhafer et al. |
| 6,251,346 | B1 | 6/2001 | Neuman et al. |
| 6,322,767 | B1 | 11/2001 | Neuman et al. |
| 6,428,759 | B1 | 8/2002 | Smith et al. |
| 6,589,497 | B2 | 7/2003 | Smith |
| 7,645,435 | B2 | 1/2010 | Braman et al. |
| 2003/0084547 | A1 | 5/2003 | Hazen et al. |
| 2003/0095912 | A1 | 5/2003 | Copenhafer |
| 2003/0143149 | A1 | 7/2003 | Braman et al. |
| 2004/0197258 | A1 | 10/2004 | Braman et al. |
| 2006/0196836 | A1 | 9/2006 | Arakel et al. |
| 2010/0290976 | A1 | 11/2010 | Hansen et al. |

*Primary Examiner* — Edward Johnson
(74) *Attorney, Agent, or Firm* — Coats and Bennett PLLC

(57) ABSTRACT

A process is provided for recovering sodium chloride crystals and sodium carbonate decahydrate crystals from a concentrated brine that results from a gas mining operation where gas and produced water is recovered and the produced water constitutes a brine. An initial pre-concentration process is carried out where the brine is concentrated and in the process carbon dioxide is removed from the brine and at least some sodium bicarbonate is converted to sodium carbonate. In one process, the concentrated brine is directed to a sodium chloride crystallizer where the brine is heated and further concentrated to form sodium chloride crystals which are separated from the brine to yield a product and wherein the resulting brine is termed a first mother liquor. The first mother liquor is then directed to a sodium carbonate decahydrate crystallizer where the first mother liquor is cooled and concentrated resulting in the formation of sodium carbonate decahydrate crystals and a second mother liquor. The second mother liquor is split into two streams where one stream is directed back to the sodium chloride crystallizer while the other stream is wasted or further treated.

26 Claims, 6 Drawing Sheets

EVAPORATIVE CONCENTRATION OF PRODUCED BRINE

SELECTIVE SALT RECOVERY FROM MIXED SALT BRINE

FIELD OF THE INVENTION

The present invention relates to recovering various salts from a brine, and more particularly to a method for treating a brine formed from produced water recovered from coal seam gas.

BACKGROUND OF THE INVENTION

Coal seam gas is a form of natural gas trapped in the molecular structure of coal beds. Typically the gas is usually produced from coal that is either too deep or of too low quality to be mined commercially. In a typical coal seam gas recovery process, the process begins by drilling a well that is sometimes as deep as 500 meters below the ground. Water and gas are pumped from the well. The gas is cleaned by separating the water from the gas. The separated water is referred to as produced water and because of the various salts contained therein is commonly referred to as a brine. The brine separated from the coal gas is typically rich in sodium bicarbonate, sodium carbonate and sodium chloride. If recovered, sodium chloride and sodium carbonate have significant commercial value. The challenge however is recovering these salts in a practical, efficient and cost effective way.

SUMMARY OF THE INVENTION

The present invention entails a method or process for recovering sodium chloride crystals and sodium carbonate decahydrate crystals. A brine rich in sodium chloride and sodium carbonate is concentrated. Once concentrated a series of crystallizers, such as an evaporative crystallizer and a cooling crystallizer disposed in series, are used to recover from the brine sodium chloride crystals and sodium carbonate decahydrate crystals.

In one embodiment, the concentrated brine is directed to an evaporative crystallizer where the brine is heated, further concentrating the brine and producing sodium chloride crystals. The sodium chloride crystals are separated from the brine which results in a first mother liquor. The first mother liquor is directed to a cooling crystallizer where the first mother liquor is cooled, concentrating the first mother liquor and producing sodium carbonate decahydrate crystals. The sodium carbonate decahydrate crystals are separated, leaving a second mother liquor. A portion of the second mother liquor can be redirected back to the evaporative crystallizer.

In another embodiment, a portion of concentrated brine can first be directed to the cooling crystallizer where the sodium carbonate decahydrate crystals are formed and eventually separated. A portion of the second mother liquor can be directed to the evaporative crystallizer and heated to produce the sodium chloride crystals that are separated from the second mother liquor, leaving a first mother liquor that is then directed to the cooling crystallizer for further processing.

Other objects and advantages of the present invention will become apparent and obvious from a study of the following description and the accompanying drawings which are merely illustrative of such invention.

DESCRIPTION OF EXEMPLARY EMBODIMENTS

Figure 1:
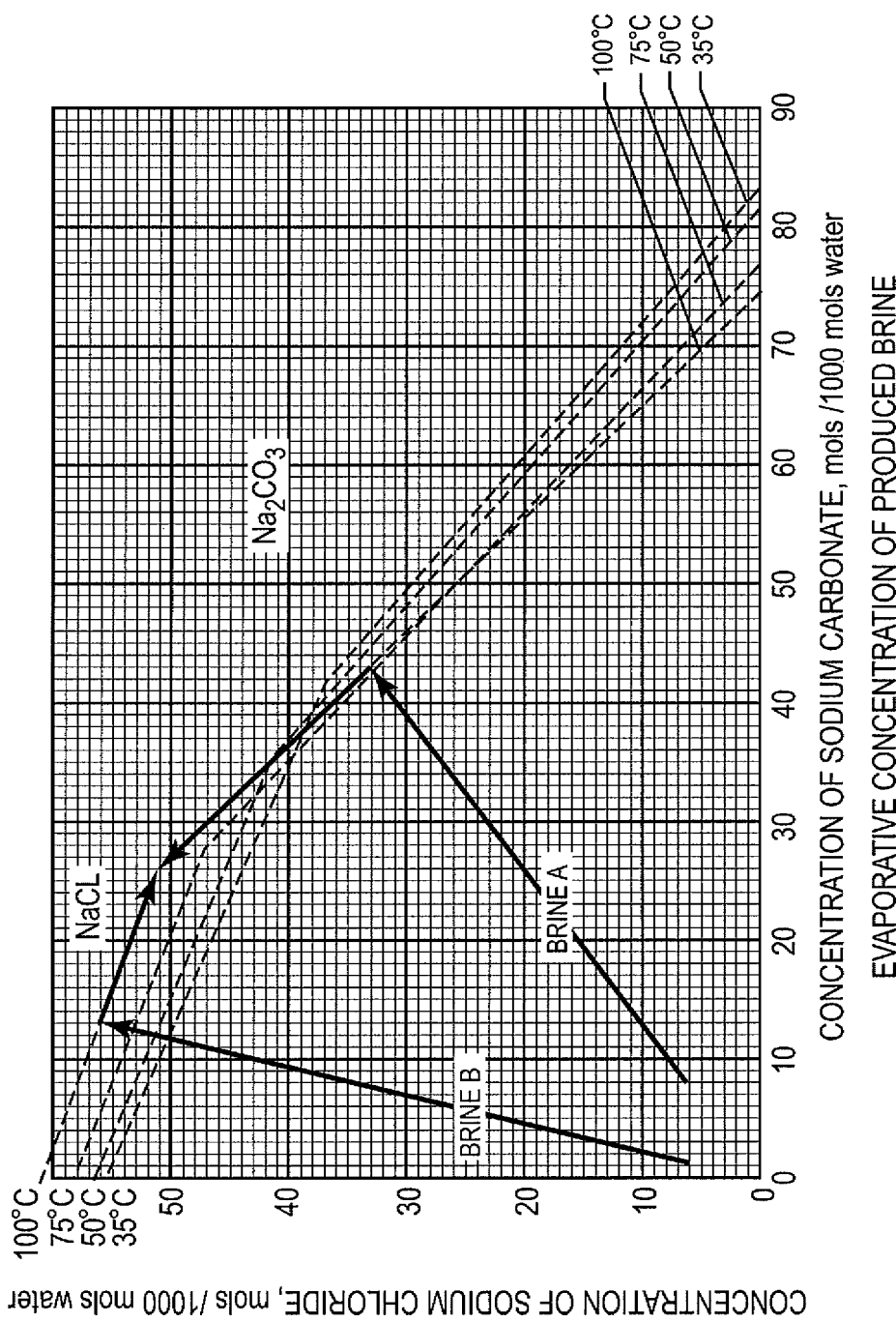
FIG. 1 shows the solubility limits at relatively low temperatures of an aqueous mixture of sodium chloride and sodium carbonate.

Before discussing the particular process in more detail, it may be beneficial to review the solubility limits of an aqueous mixture containing sodium chloride, sodium carbonate, and sodium carbonate decahydrate. FIG. 1 shows the solubility limit of an aqueous mixture of sodium chloride and sodium carbonate along with the path that the mixture will take as water is removed by evaporation or other means. Two samples of produced water or brine are shown, one is identified as "Brine B" and one is identified as "Brine A". The path of these two samples helps understand and appreciate the present invention and further suggests why slight variations in the process might be beneficial in certain cases.

For any brine composition, one starts at a low concentration (lower left limit of the brine characteristic line) and progresses up and to the right as the brine is pre-concentrated. Pre-concentration by either reverse osmosis or thermal evaporation should stop before reaching the saturation limits due to physical limitations of these processes. Further concentration, by any means, will remove water until the characteristic line intercepts the solubility limit. Any further concentration will precipitate one or more salts. The composition of the remaining brine solution will follow the saturation limit until it reaches a "triple" point that reflects equilibrium of both salts and solution. From that point onward, a salt mixture is produced.

Following the "Brine B" brine line, the intercept is in the sodium chloride region of the diagram and this is the first salt precipitated. Following the "Brine A" brine line, the intercept is in the sodium carbonate region and that is the first salt precipitated. Unfortunately in some cases, the quantity of individual salt that can be produced by applying such a process is limited with certain brine compositions. Further, the character of individual salts recovered can rapidly change with small changes in brine composition.

Figure 2:
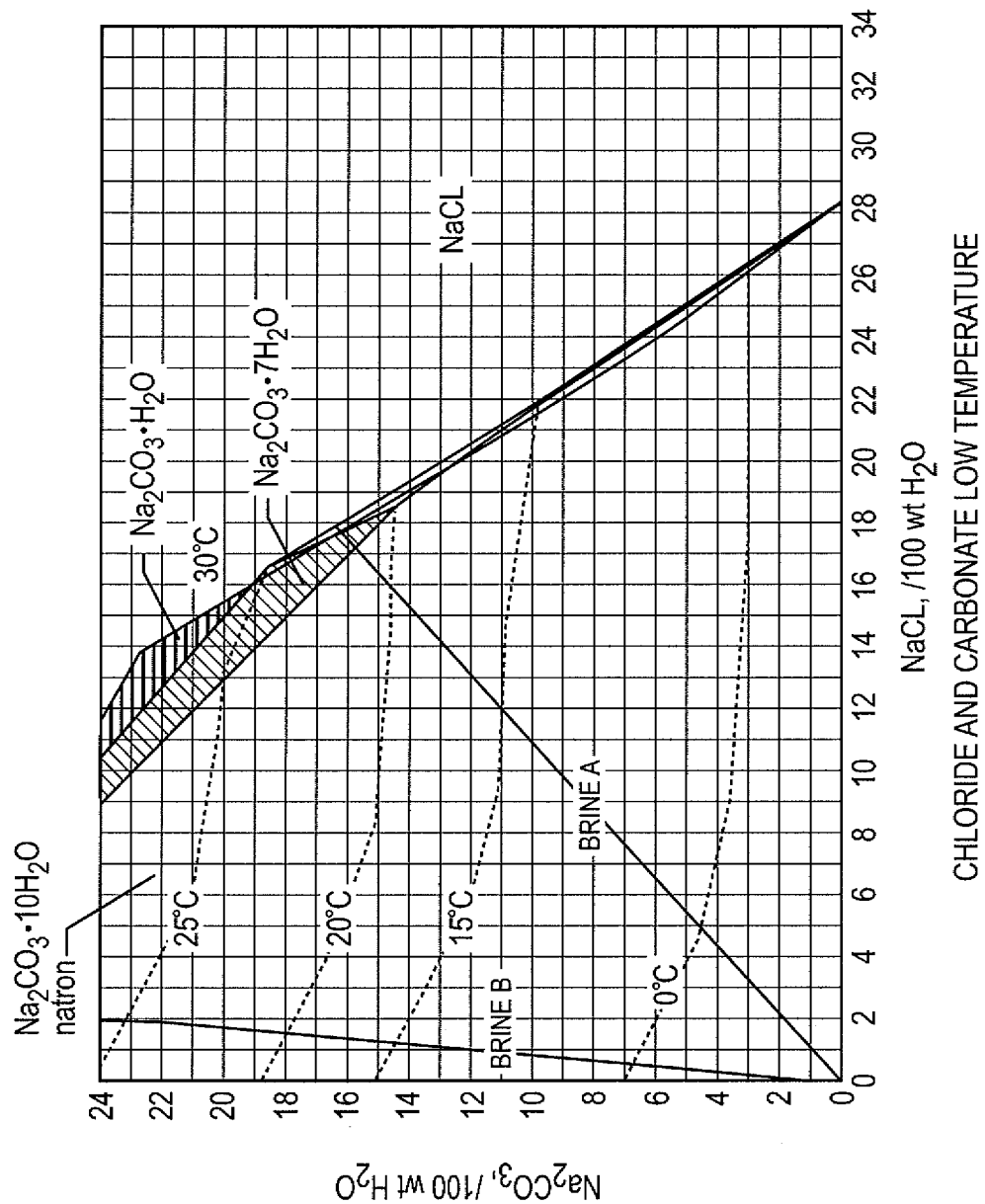
FIG. 2 shows the solubility limits at relatively low temperatures of a number of compounds including sodium carbonate decahydrate and sodium chloride.

FIG. 2 shows the solubility limits of an aqueous mixture of sodium chloride and sodium carbonate at much lower temperatures than is shown in FIG. 1. Again, the path lines of the "Brine B" and "Brine A" brines are shown. As will be discussed further, the process is shown in the following schematics takes advantage of the physical and chemical properties of the compounds referred to in FIGS. 1 and 2.

The present invention relates to a method or process for selectively recovering salts from a mixed salt brine. In particular, the process entails recovering sodium chloride crystals and sodium carbonate decahydrate crystals from a brine that is generally rich in sodium chloride, sodium bicarbonate, and sodium carbonate. In many cases, the process is more effective if the brine is concentrated. In other cases the brine may be sufficiently concentrated at the outset without a specific process step aimed at concentrating the brine. In any event the concentrated brine typically includes a total dissolved solids concentration of approximately 180,000 mg/l to approximately 240,000 mg/l.

The concentrated brine, in one process embodiment is first directed to an evaporative crystallizer. Here the concentrated brine is heated to a temperature of 50° C. or higher. In one embodiment, the concentrated brine in the evaporative crystallizer is heated to 100° C. or above, for example 108° C. at 1 atm. Evaporation of water from the brine at these temperatures further concentrates the brine and forms sodium chloride crystals.

From the evaporative crystallizer, the concentrated brine with the sodium chloride crystals is directed to a solid separator and the sodium chloride crystals are separated from the brine. This produces a sodium chloride crystal product and a first mother liquor.

The first mother liquor is then directed to an evaporative cooling crystallizer. Here the temperature of the first mother liquor is lowered to a temperature of 30° C. or below. Removal of water at this temperature concentrates the first mother liquor and produces sodium carbonate decahydrate crystals ($Na_2CO_3.10H_2O$). Thereafter the first mother liquor including the sodium carbonate decahydrate crystals is directed to a solids separator which separates the sodium carbonate decahydrate crystals and in the process gives rise to a second mother liquor. The second mother liquor can be split into two streams, one stream directed back to the evaporative crystallizer for further processing and one stream being deemed a waste stream or further used or treated.

Figure 3:
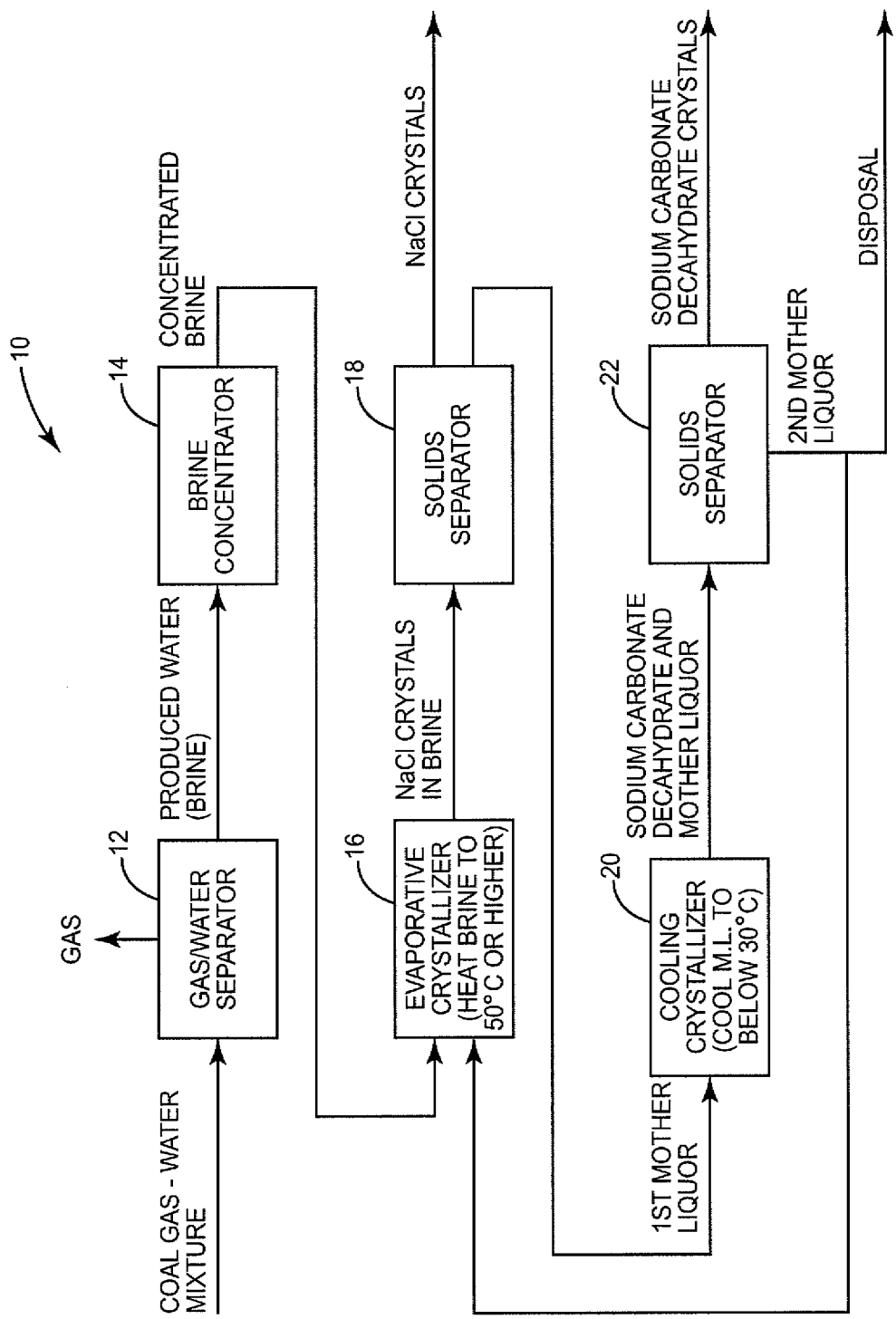
FIG. 3 is a schematic of a process for recovering sodium chloride crystals and sodium carbonate decahydrate crystals from a brine.

FIG. 3 shows a process for treating the produced water from a coal seam gas recovery process. Although the process depicted in FIG. 1 relates to a brine that is formed from produced water, it is appreciated by those skilled in the art that the present invention dealing with recovering sodium chloride crystals and sodium carbonate decahydrate crystals can be applied to brines originating from other sources. As will be evident from subsequent portions of this disclosure, the process shown in FIG. 3, indicated generally by the numeral 10, provides for the recovery of sodium chloride crystals and sodium carbonate decahydrate crystals from a brine that is formed from the produced water. As a part of the coal gas recovery process, a mixture of coal gas and water is produced and recovered. The process shown in FIG. 3 entails directing the coal gas-water mixture to a gas-water separator 12. The process and devices utilized to separate water from gas is well known in the art. Essentially the gas-water separator 12 separates the gas from what is commonly referred to as produced water. In this case, the produced water is rich in sodium chloride, sodium bicarbonate, and sodium carbonate. Thus, the produced water is referred to herein as brine. The constituents and make up of the brine can vary from location to location. Typically, the total dissolved solids in the produced water brine will be approximately 4,000 to 10,000 ppm.

In one embodiment of the present process, it is desirable to pre-concentrate the brine prior to removing the selected salts. There are various approaches to pre-concentration. One approach to pre-concentrating the brine is by employing natural evaporation, such as a solar pond. Other forms of pre-concentration devices or systems include reverse osmosis units, evaporators such as falling film evaporators, and any combination of the above. In the pre-concentration process, carbon dioxide will be removed and in the process some sodium bicarbonate will be converted to sodium carbonate. While the make up of the concentrated brine will vary, in typical applications the total dissolved solids in the concentrated brine will be approximately 20-30% wt.

Once the brine is concentrated in the brine concentrator 12, the concentrated brine is directed to an evaporative crystallizer 16. In the evaporative crystallizer the brine is heated to 50 degrees and above. It is preferable to heat the concentrated brine to 100° C. or above. In one particular application the brine is heated to approximately 108° C. at 1 atm. This for a typical application is generally the boiling temperature of the concentrated brine.

Evaporation of water from the brine in the evaporative crystallizer 16 further concentrates the brine and causes the solubility limits of sodium chloride to be exceeded. This results in the precipitation of sodium chloride crystals. Thus, the evaporative crystallizer produces a mixture of sodium chloride crystals and brine.

This mixture is directed to a solids separator 18. Various conventional solids separators can be used such as settling tanks, centrifuges, filter presses, etc. In the solids separator 18, the sodium chloride crystals are separated and recovered. The residual brine is referred to herein as the first mother liquor.

From the solids separator 18, the first mother liquor is directed to a cooling crystallizer 20. Various types of cooling crystallizers can be employed. For example, flash cooling with evaporation is one option while a refrigerant-supplied heat exchanger without evaporation is another option. In any event, the function of the cooling crystallizer is to lower the temperature of the first mother liquor to approximately 30° C. or below. In some preferred processes the temperature of the first mother liquor is lowered to approximately 15° C. to approximately 20° C. This cooling, and if needed combined with water removal via evaporation, causes the solubility limit of sodium carbonate to be exceeded. Hence the cooling crystallizer 20 causes sodium carbonate decahydrate crystals or "natron" ($NA_2CO_3.10H_2O$) to be precipitated. Hence the cooling crystallizer 20 produces a mixture of sodium carbonate decahydrate crystals and mother liquor. This mixture is directed to a solids separator where the sodium carbonate decahydrate crystals are separated from the first mother liquor. The sodium carbonate decahydrate crystals are thus recovered and can be further processed to produce various commercial chemicals.

The separation of the sodium carbonate decahydrate crystals from the first mother liquor effectively forms a second mother liquor. In the embodiment shown in FIG. 1 the second mother liquor is divided into two streams, one stream is directed back to the evaporative crystallizer 16 for further treatment while the second stream can be subjected to further processing or to some appropriate form of disposal.

Figure 4:
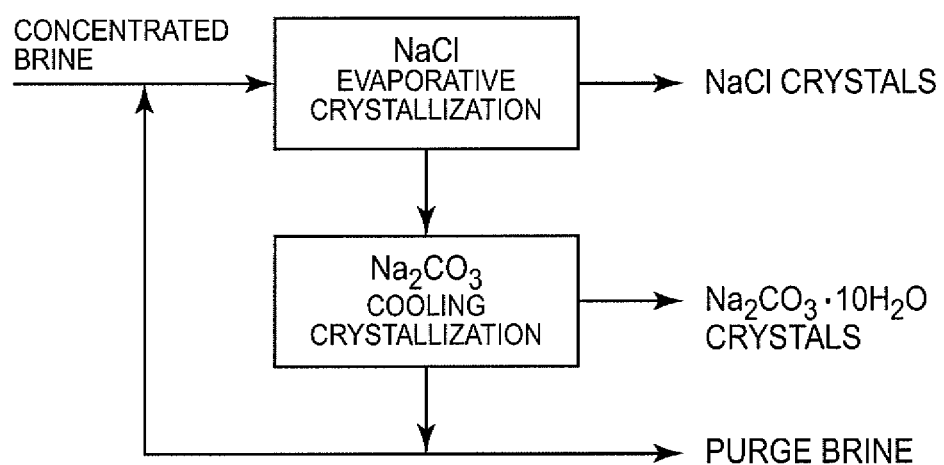
FIG. 4 is a schematic illustration showing one process embodiment for recovering the sodium chloride crystals and sodium carbonate decahydrate crystals.
Figure 5:
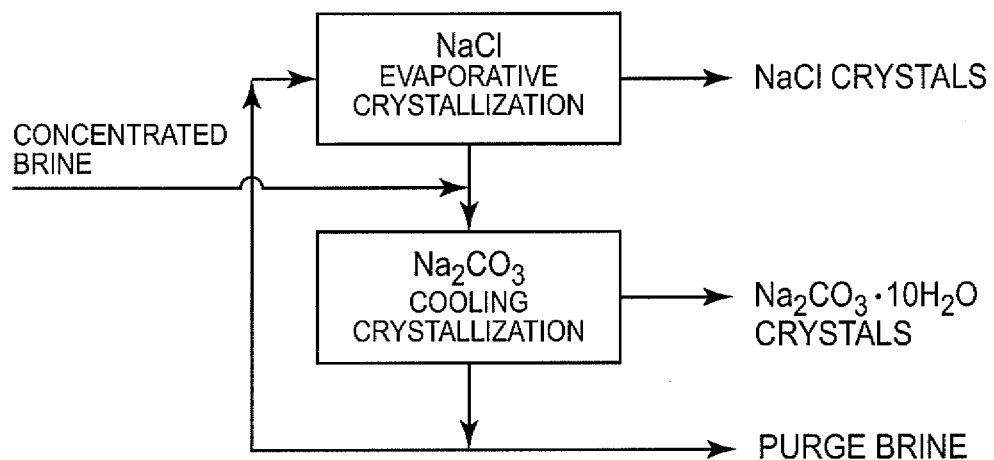
FIG. 5 is a schematic showing a second process embodiment for recovering sodium chloride crystals and sodium carbonate decahydrate crystals.
Figure 6:
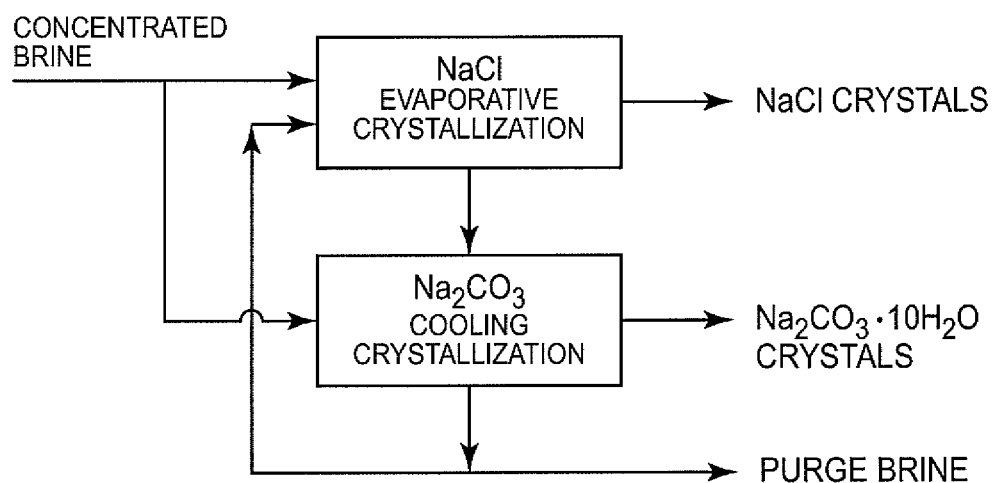
FIG. 6 is a schematic illustration showing yet a third process embodiment for recovering sodium chloride crystals and sodium carbonate decahydrate crystals.

FIGS. 4, 5 and 6 show alternative but similarly related process for recovering sodium chloride crystals and sodium carbonate decahydrate crystals. The process exemplified in FIG. 4 is the same as that described above and shown in FIG. 3. More particularly, the concentrated brine is first directed to the evaporative crystallizer 16 and the resulting first mother liquor is directed to the cooling crystallizer 20 and thereafter, as explained above, the resulting second mother liquor is split with one stream being returned to the evaporative crystallizer while the other stream used in various ways or even directed to disposal.

The FIG. 4 process is particularly suited when the sodium chloride to sodium carbonate ratio is relatively high. A relatively high sodium chloride to sodium carbonate ratio would be approximately 2 to 1.

When the ratio of sodium chloride to sodium carbonate in the concentrated brine is relatively low (approximately 0.5 to approximately 1), a process such as depicted in FIG. 5 might be more appropriate. In this case the concentrated brine is first directed to the cooling crystallizer 20 and, as illustrated in FIG. 5, the sodium carbonate decahydrate crystals are produced therein. One stream of the resulting second mother liquor is directed to the evaporative crystallizer 16 which produces the sodium chloride crystals. Then the resulting first mother liquor is joined with the concentrated brine influent and directed into the cooling crystallizer 20.

Where the ratio of sodium chloride to sodium carbonate in the concentrated brine lies intermediately between the relatively high ratio and the relatively low ratio, a process such as shown in FIG. 6 may be appropriate. Here the concentrated brine influent is split into two streams, a first stream that is directed into the evaporated crystallizer 16 and a second stream directed into the cooling crystallizer 20. Here again, at least a portion of the second mother liquor leaving the cooling crystallizer 20 may be returned and fed into the evaporative crystallizer 16. Likewise, the resulting first mother liquor from the evaporative crystallizer is fed along with the concentrated brine stream to the cooling crystallizer 20.

Figure 7:
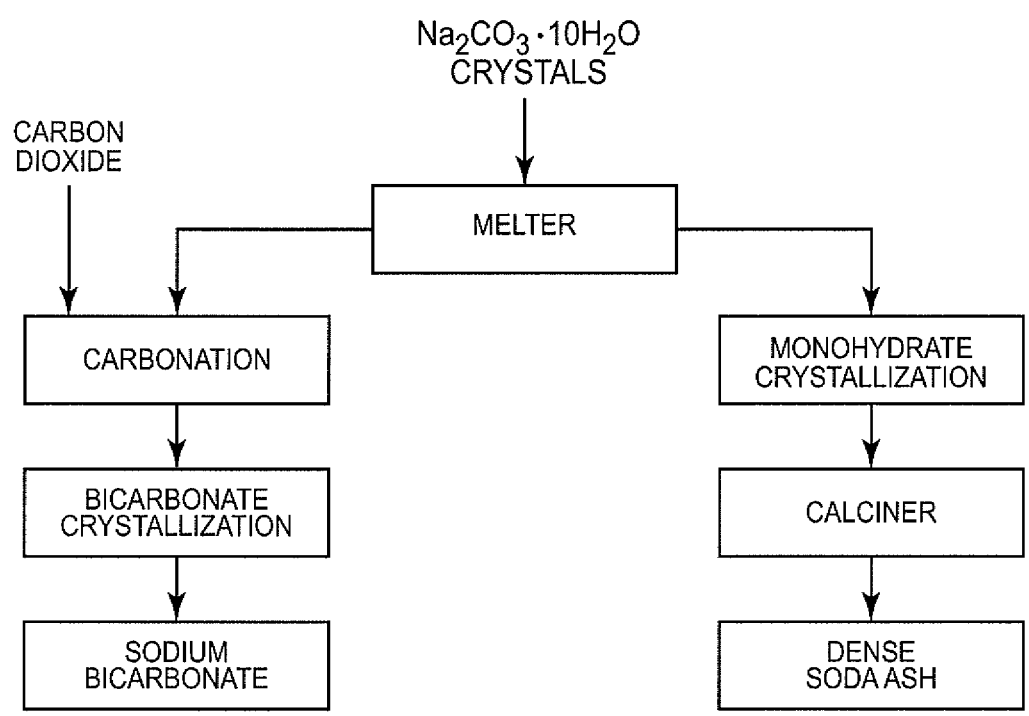
FIG. 7 is a schematic illustration showing two possible beneficiation processes for improving the commercial utility of sodium carbonate decahydrate crystals.

The individual salts recovered in the processes described above may require beneficiation to maximize commercial value. For example, the sodium chloride may be appropriately improved by dissolution and re-crystallization as it is often done with sea salt. The natron or sodium carbonate decahydrate crystals may be improved by employing the processes shown in FIG. 7 that treat the sodium carbonate decahydrate crystals to form dense soda ash or sodium carbonate. In the case of forming sodium carbonate, the sodium carbonate decahydrate crystals are subjected to carbonation where carbon dioxide is added. Thereafter, the carbonated sodium carbonate decahydrate crystals are subjected to bicarbonate crystallization that produces the sodium bicarbonate. In producing the dense soda ash, the sodium carbonate decahydrate crystals are subjected to monohydrate crystallization and thereafter to a calcination process which produces the dense soda ash.

The process described above for recovering sodium chloride crystals and sodium carbonate decahydrate crystals from a mixed brine solution has many advantages. First compared to known processes, the present process generates little or no waste material. Further compared to known processes, the present process requires little or no reagents to actually recover the salts. Finally, the process of the present invention minimizes residual waste. Finally, recovery of salts in the present process does not require evaporation ponds.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of recovering sodium chloride and sodium carbonate decahydrate from a concentrated brine containing sodium chloride and sodium carbonate, wherein the concentrated brine is formed from produced water separated from gas in a gas recovery process and concentrated in a pre-concentration process, the method comprising:
    directing the concentrated brine to an evaporative crystallizer and heating the brine to a temperature of 50° C. or higher and further concentrating the brine and producing sodium chloride crystals;
    separating the sodium chloride crystals from the brine;
    directing the concentrated brine to a cooling crystallizer and subjecting the brine to a temperature of 30° C. or lower and further concentrating the brine and producing sodium carbonate decahydrate crystals; and
    separating the sodium carbonate decahydrate crystals from the brine.

2. The method of claim 1 wherein the evaporative crystallizer and cooling crystallizer are in series and the method includes:
    first directing the pre-concentrated brine to the evaporative crystallizer; and
    wherein the brine directed to the cooling crystallizer is a first mother liquor resulting from the separation of the sodium chloride crystals from the brine.

3. The method of claim 1 further including:
    first directing the pre-concentrated brine to the cooling crystallizer;
    wherein separating the sodium carbonate decahydrate crystals from the brine produces a second mother liquor; and
    wherein the brine directed to the evaporative crystallizer includes at least a portion of a second mother liquor.

4. The method of claim 2 wherein the ratio of sodium chloride to sodium carbonate in the concentrated brine is relatively high.

5. The method of claim 3 wherein the ratio of sodium chloride to sodium carbonate in concentrated brine is relatively low.

6. The method of claim 1 wherein in separating the sodium chloride crystals from the brine produces a first mother liquor and wherein the brine directed to the cooling crystallizer comprises at least a portion of the first mother liquor.

7. The method of claim 6 wherein separating the sodium carbonate decahydrate crystallizer produces a second mother liquor and wherein at least a portion of the second mother liquor is returned to the evaporative crystallizer for further processing.

8. The method of claim 7 wherein the concentrated brine is heated in the evaporative crystallizer to approximately 100° C. or higher and wherein the brine is cooled in the cooling crystallizer to a temperature of approximately 15° C. to approximately 20° C.

9. A method of treating produced water containing sodium chloride and sodium carbonate and recovering sodium chloride crystals and sodium carbonate decahydrate crystals from the produced water where the produced water is formed from separating water from gas in a gas recovery process, the method comprising:
    pre-concentrating the produced water to form a concentrated brine or providing a concentrated brine that results from the pre-concentration of the produced water;
    directing the concentrated brine to a sodium chloride crystallizer and heating the concentrated brine to a temperature of at least 50° C. so as to further concentrate the brine and produce sodium chloride crystals;
    separating the sodium chloride crystals from the brine to produce a first mother liquor;
    directing the first mother liquor to an sodium carbonate decahydrate crystallizer and cooling the first mother liquor to a temperature of approximately 30° C. or lower so as to concentrate the first mother liquor and produce sodium carbonate decahydrate crystals; and
    separating the sodium carbonate decahydrate crystals from the first mother liquor to form a second mother liquor.

10. The method of claim 9 including returning a portion of the second mother liquor to the sodium chloride crystallizer for further processing.

11. The method of claim 9 including cooling the first mother liquor to a temperature of approximately 15° C. to approximately 20° C. which results in the production of the sodium carbonate decahydrate crystals.

12. The method of claim 9 wherein the pre-concentrated brine includes a total dissolved solids concentration of approximately 20 to approximately 30% wt.

13. The method of claim 9 wherein the ratio of sodium chloride to sodium carbonate in the pre-concentrated brine is relatively high.

14. The method of claim 9 wherein the pre-concentrated brine is heated to a temperature of approximately 100° C. or higher in the sodium chloride crystallizer.

15. A method of treating produced water containing sodium chloride and sodium carbonate and recovering sodium chloride crystals and sodium carbonate decahydrate crystals from the produced water where the produced water is formed from separating water from gas in a gas recovery process, the method comprising:
pre-concentrating the produced water to form a concentrated brine or providing a concentrated brine that results from the pre-concentration of the produced water;
directing at least some of the concentrated brine to an sodium carbonate decahydrate crystallizer and cooling the concentrated brine to a temperature below 30° C. so as to concentrate the brine and produce sodium carbonate decahydrate crystals;
separating the sodium carbonate decahydrate crystals from the brine to form a second mother liquor;
directing at least a portion of the second mother liquor to a sodium chloride crystallizer and heating the second mother liquor to a temperature of at least approximately 50° C. so as to concentrate the second mother liquor and form sodium chloride crystals;
separating the sodium chloride crystals from the second mother liquor to form a first mother liquor;
directing at least a portion of the first mother liquor to the sodium carbonate decahydrate crystallizer for further processing.

16. The method of claim 15 including cooling the second mother liquor to a temperature of approximately 15° C. to approximately 20° C. which results in the production of the sodium carbonate decahydrate crystals.

17. The method of claim 15 wherein the pre-concentrated brine includes a total dissolved solids concentration of approximately 20 to approximately 30% wt.

18. The method of claim 15 wherein the ratio of sodium chloride to sodium carbonate in the concentrated brine is relatively low.

19. The method of claim 15 wherein the pre-concentrated brine in the sodium chloride crystallizer is heated to a temperature of approximately 100° C. or higher.

20. The method of claim 9 wherein the method comprises pre-concentrating the produced water to form the concentrated brine.

21. The method of claim 20 including directing the produced water to a thermal evaporator and pre-concentrating the produced water in the thermal evaporator to form the concentrated brine.

22. The method of claim 15 wherein the method comprises pre-concentrating the produced water to form the concentrated brine.

23. The method of claim 22 including directing the produced water to a thermal evaporator and pre-concentrating the produced water in the thermal evaporator to form the concentrated brine.

24. The method of claim 15 including directing some of the concentrated brine first to the sodium carbonate decahydrate crystallizer and directing at least some of the concentrated brine first to the sodium chloride crystallizer.

25. The method of claim 24 including simultaneously directing some of the concentrated brine to the sodium carbonate decahydrate crystallizer and some of the concentrated brine to the sodium chloride crystallizer.

26. A method of treating a brine containing sodium chloride, sodium carbonate and other contaminants and for recovering sodium chloride crystals and sodium carbonate decahydrate crystals from the brine, the method comprising:
directing at least some of the brine to an evaporative crystallizer and heating the brine to a temperature of at least 50° C. so as to further concentrate the brine and produce sodium chloride crystals;
separating the sodium chloride crystals from the brine to produce a first mother liquor;
directing the first mother liquor to a cooling crystallizer and cooling the first mother liquor to a temperature of approximately 30° C. or lower so as to concentrate the first mother liquor and produce sodium carbonate decahydrate crystals;
separating the sodium carbonate decahydrate crystals from the first mother liquor to form a second mother liquor;
recycling at least a portion of the second mother liquor to the evaporative crystallizer for further processing; and
wherein another portion of the second mother liquor includes contaminants contained within the brine.

* * * * *